United States Patent
Isenmann et al.

(10) Patent No.: US 8,069,720 B2
(45) Date of Patent: Dec. 6, 2011

(54) SENSOR HOUSING WITH SOLAR MODULE FOR FIELD DEVICE

(75) Inventors: Andreas Isenmann, Haslach i.K. (DE);
Volker Allgaier, Haslach i.K. (DE);
Josef Fehrenbach, Haslach (DE);
Thomas Deck, Wolfach (DE); Guenter Kech, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 249 days.

(21) Appl. No.: 12/473,067

(22) Filed: May 27, 2009

(65) Prior Publication Data
US 2010/0257930 A1 Oct. 14, 2010

Related U.S. Application Data

(60) Provisional application No. 61/167,974, filed on Apr. 9, 2009.

(51) Int. Cl.
*G01F 15/14* (2006.01)
(52) U.S. Cl. .......................................................... 73/273
(58) Field of Classification Search .................. 126/570, 126/704; 136/256, 243, 244, 291, 251; 174/50
See application file for complete search history.

(56) References Cited

U.S. PATENT DOCUMENTS

| 6,960,716 | B2 * | 11/2005 | Matsumi et al. | 136/244 |
|---|---|---|---|---|
| 7,737,355 | B2 * | 6/2010 | Nieleck et al. | 136/243 |
| 7,880,080 | B2 * | 2/2011 | Lares et al. | 136/243 |
| 2005/0000562 | A1 * | 1/2005 | Kataoka et al. | 136/251 |
| 2005/0030177 | A1 | 2/2005 | Albsmeier et al. | |
| 2005/0099289 | A1 | 5/2005 | Arita et al. | |
| 2005/0245291 | A1 | 11/2005 | Brown et al. | |
| 2008/0011287 | A1 | 1/2008 | Staiger et al. | |
| 2008/0183935 | A1 * | 7/2008 | Guenter et al. | 710/305 |
| 2009/0136288 | A1 * | 5/2009 | Ersoy et al. | 403/76 |

FOREIGN PATENT DOCUMENTS

| DE | 10 2004 032 618 | 2/2005 |
|---|---|---|
| DE | 10 2006 032 250 | 1/2008 |
| EP | 0 884 567 | 12/1998 |
| WO | 01/73 382 | 10/2001 |
| WO | 03/034366 | 4/2003 |

* cited by examiner

*Primary Examiner* — Jewel V Thompson
(74) *Attorney, Agent, or Firm* — Fay Kaplun & Marcin, LLP (57) ABSTRACT

A sensor housing for a field device includes a housing body and a solar module that may be put in place and removed. The solar module supplies the field device with electrical energy and may be placed on top of the housing body at various angles of rotation, as a result of which at the same time an electrical contact between the solar module and an energy storage device is provided.

16 Claims, 5 Drawing Sheets

Fig. 9

# SENSOR HOUSING WITH SOLAR MODULE FOR FIELD DEVICE

RELATED APPLICATION

The present application is based on, and claims priority of, the U.S. Provisional Application No. 61/167,974, filed on Apr. 9, 2009, whose priority is herewith claimed, and whose disclosure is herewith included by a reference.

FIELD OF THE INVENTION

The invention relates to the measuring of fill levels, limits, pressure and flow. In particular, the invention relates to a sensor housing for a field device for fill level measuring, pressure measuring, limit measuring or flow measuring; to a field device; to a modular system for producing various field devices; and to the use of a sensor housing in a field device.

TECHNOLOGICAL BACKGROUND

Field devices are used for measuring a pressure, a fill level of a container, or a flow through a line. These field devices may be tailor-made according to specific customer requirements. This often entails relatively high expenditure. When the requirements which a field device is to meet change, this often necessitates the purchase of a new field device.

For energy supply, the field devices may be connected to an external energy source, for example using two-wire technology.

SUMMARY OF THE INVENTION

The present invention relates to a sensor housing for a field device for fill level measuring, pressure measuring, limit measuring and flow measuring; a field device comprising such a sensor housing; a modular system for producing various field devices for fill level measuring, pressure measuring, limit measuring or flow measuring; as well as the use of such a sensor housing in a field device. Some of the advantages of the present invention include facilitating the production and fabrication of field devices, and improving the flexibility and application options of the field devices.

It should be noted that characteristics that below are, for example, described with regard to the sensor housing may also be implemented in the modular system or in the field device and vice versa.

According to an exemplary embodiment of the invention, a sensor housing for a field device for fill level measuring, pressure measuring, limit measuring and/or flow measuring is stated. The sensor housing comprises a housing body (also simply referred to as the "housing") as well as a solar module. The solar module is designed in such a way that it can be placed on top of the housing body. Furthermore, the solar module is designed to supply the field device with electrical energy.

For example, the solar module is disconnectably connected to the housing body so that, when required, it can be affixed to, or removed from, the housing body.

For example, the sensor housing is designed so as to be multifunctional. This means that the sensor housing, if desired, can (as an alternative or in addition to the supply provided by the solar module) be connected to an external energy supply, for example to a two-conductor loop (4 . . . 20 mA).

According to a further exemplary embodiment of the invention, the sensor housing comprises an energy storage module for storing the electrical energy collected by the solar module. The housing body comprises a first chamber and a second chamber, wherein the energy storage device is arranged in the first chamber.

The solar module is, for example, placed on top of the first chamber so that an electrical connection to the energy storage device is established. In this arrangement the first chamber is closed off by the solar module, for example even in a manner so as to be waterproof.

According to a further exemplary embodiment of the invention, the sensor housing comprises a measured-value transmission module for transmitting measured values to an external unit, for example to a control unit, wherein the measured-value transmission module is arranged in the second chamber.

The second chamber may also be closed off with a corresponding housing cover.

The chambers are thus closable by means of a respective cover, and/or are divided from each other by means of a partition wall. The transmission module may be matched to the shape of the first chamber. For example, the transmission module is geometrically designed so that it fits into the second chamber. In the same manner the energy storage module, which is, for example, an accumulator or a capacitor circuit, can be matched to the shape of the first chamber so that no additional attachment of the energy storage module and the measured-value transmission module in the chambers is necessary.

According to a further exemplary embodiment of the invention, the solar module comprises a first group of electrical sliding contacts, wherein the housing body comprises a second group of electrical sliding contacts that corresponds to the first group. The electrical sliding contacts of the first group and of the second group are matched to each other in such a way that they make it possible to place the solar module on top of the housing body and an electrical connection between the solar module and the energy storage device, which connection is connected to the housing body, at various angles of rotation.

In other words, the solar module may be placed at different angles on top of the housing, and can be moved from this placement position to a locked position in which an electrical contact between the energy storage device and the solar module is established.

According to a further exemplary embodiment of the invention, the solar module is screwed onto the housing body. It is also possible to provide a bayonet closing device in order to attach the solar module to the housing body.

According to a further exemplary embodiment of the invention, the sensor housing comprises charge-protection electronics for the energy storage device, which charge-protection electronics are accommodated in the energy storage module.

According to a further exemplary embodiment of the invention, the sensor housing comprises a mounting connection that is used to affix the sensor housing to a mounting plate. The mounting plate can, for example, form part of a tank or can be connected to the tank.

According to a further exemplary embodiment of the invention, the mounting connection is designed to affix the sensor housing to a ball-and-socket joint head, as a result of which it becomes possible to tilt or rotate the sensor housing.

In this way it is possible to always set the solar module optimally in relation to the position the sun is in at the time, because the ball-and-socket joint permits rotation of the sensor housing in all spatial directions.

According to a further exemplary embodiment of the invention, the sensor housing comprises an automatic tracking unit for tilting the sensor housing so that a surface normal of the solar module points in the direction of the sun when the sensor housing is installed on a tank.

According to a further exemplary embodiment of the invention, the sensor housing comprises a GPS receiver for transmitting information relating to the actual position of the sun at the location of the sensor housing to the automatic tracking unit.

According to a further exemplary embodiment of the invention, the sensor housing comprises one or several brightness sensors for determining a direction from which sunlight shines into the solar module, and for transferring information relating to this direction to the automatic tracking unit.

According to a further exemplary embodiment of the invention, a field device for fill level measuring, limit measuring, pressure measuring and/or flow measuring is stated, which field device comprises a sensor housing described above and below.

According to a further exemplary embodiment of the invention, a modular system for producing (assembling) various field devices for fill level measuring, limit measuring, pressure measuring and/or flow measuring is stated, which modular system comprises a sensor housing with a solar module as described above and below.

According to a further exemplary embodiment of the invention, the modular system further comprises sensor electronics and a control module. In this arrangement the energy storage module is exchangeable through the sensor electronics. Likewise, the solar module is exchangeable through the control module. For example, both the solar module and the control module may thus be screwed onto the sensor housing. For example, either the energy storage module or the sensor electronics can be inserted in the first chamber.

According to a further exemplary embodiment of the invention, the use of a sensor housing, described above and below, in a field device for measuring the fill level, the limit, the pressure and/or the flow, is stated.

Below, exemplary embodiments of the invention are described with reference to the figures.

DETAILED DESCRIPTION OF EXEMPLARY EMBODIMENTS

The illustrations in the figures are diagrammatic and not to scale.

In the following description of the figures the same reference characters are used for identical or similar elements.

Figure 1:
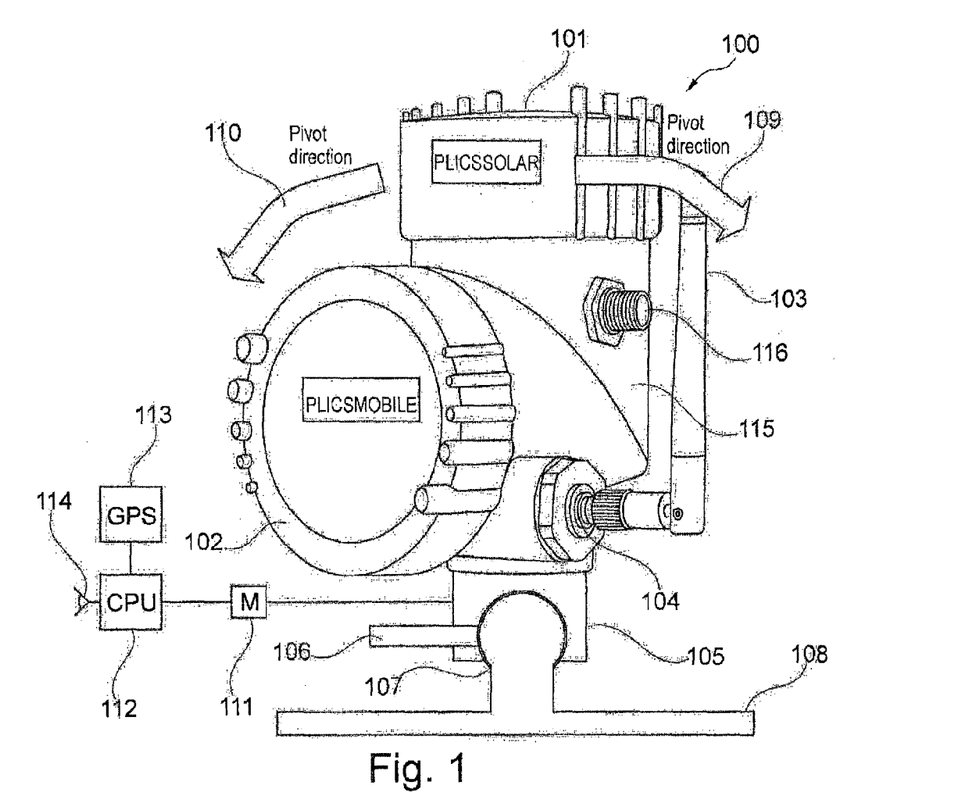
FIG. 1 shows a sensor housing with a solar module according to an exemplary embodiment of the invention.

FIG. 1 shows a sensor housing 100 according to an exemplary embodiment of the invention. The sensor housing comprises a first and a second chamber, each of which may be accessed through a cover 101, 102.

In the cover 101 there is a solar module which together with the cover 101 may be placed on top of the housing and thus on top of the first chamber. The second cover 102 may be screwed onto the second chamber, in which, for example, a measured-value transmission module for transmitting measured values and for receiving parameterizing data is located.

The sensor housing 100 comprises a mounting connection 105 with a receiver for a ball-and-socket joint 107. The ball-and-socket joint 107 is affixed to a mounting plate 108 that can, for example, be affixed to the tank or form part of the tank.

Furthermore, a locking mechanism 106 is provided, as well as a locking action of the mounting connection to the ball-and-socket joint 107.

Furthermore, a motor or drive 111 is provided, which is controlled by way of a control device (for example a CPU) 112, and which can pivot the sensor housing on the ball-and-socket joint. In this way an automatic tracking unit is provided, which makes it possible for the sensor housing to always be optimally aligned relative to the sun. To this effect an optical detector 114 may also be provided, which is connected to the control device 112 and which measures the position of the sun. The detector 114 can, for example, also be affixed to the solar module. Moreover (as an alternative or in addition) a satellite navigation receiver 113 can be provided, which by means of its internal clock and if applicable the positioning data received can determine the current position of the sun at the location of installation, so that tracking is controlled automatically.

The arrows 109, 110 show that the sensor housing 100 may be swivelled in various directions.

On the housing body 115 there is an antenna interface 104, to which an antenna 103 can be connected. Furthermore, an interface 116 is provided, to which a sensor (for example a fill-level radar sensor or an ultrasound sensor, a limit sensor, a pressure measuring sensor or a flow sensor) can be connected.

Figure 2A:
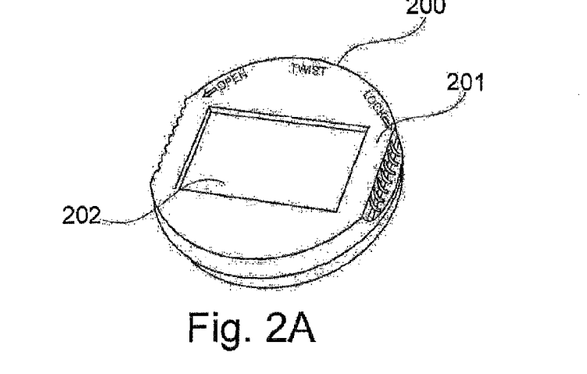
FIG. 2A shows a perspective view of a solar module according to an exemplary embodiment of the invention.

FIG. 2A shows a solar module 200 which is integrated in the cover 101 (see FIG. 1). The solar module 200 comprises a housing 201 as well as one or several solar cells 202. In addition, status LEDs and one or several control keys can be provided.

Figure 2B:
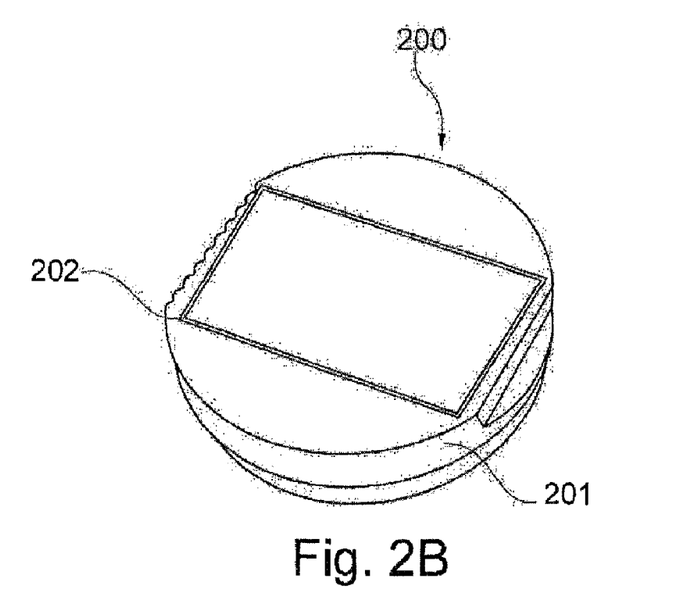
FIG. 2B shows a perspective view of a solar module according to an exemplary embodiment of the invention.

FIG. 2B shows a further embodiment of such a solar module 200.

Figure 2C:
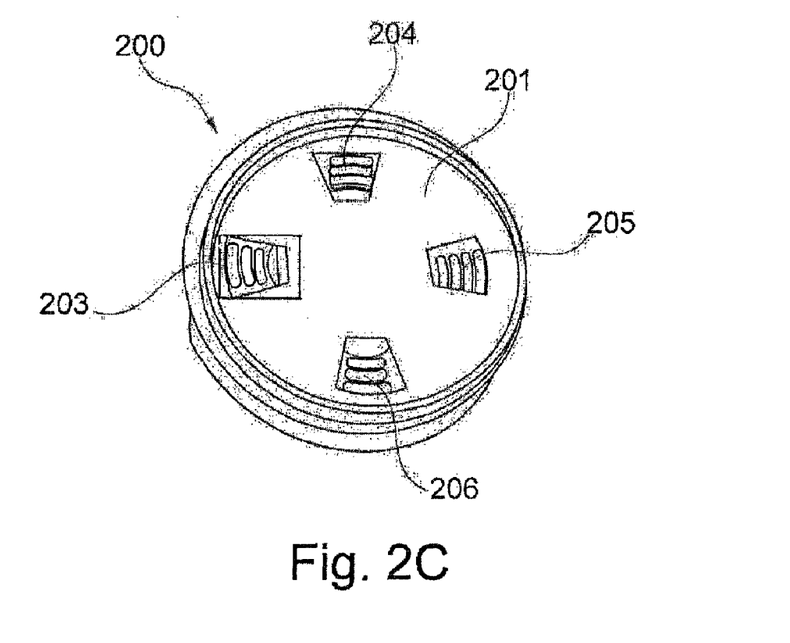
FIG. 2C shows the underside of a solar module according to an exemplary embodiment of the invention.

FIG. 2C shows the back of the solar module 200. The illustration shows a group of 4×4 sliding contacts 203, 204, 205, 206. By means of these sliding contacts it is possible to attach the solar module at at least four different positions (0 degrees, 90 degrees, 180 degrees, 270 degrees) to the housing body, and to electrically connect the energy storage device. A resolution of the sliding contacts that is finer than 90 degrees per contact is also possible in order to achieve still more precise alignment to the sun.

For this purpose the housing body comprises four corresponding contact pins that are spring-loaded and that are arranged in a row, corresponding to the indicating and adjustment module PLICSCOM made by VEGA. In other words, the connection between the solar module and the energy storage module (for example in the form of an accumulator pack) takes place as is the case with PLICSCOM.

Two of the four contacts are used to transmit energy from the solar module to the energy storage device (e.g. the accumulator in the first chamber). The further two contacts can be used in order to display information about the accumulator state on the solar module, e.g. by pressing a button on a status display (e.g. bar LEDs). This makes possible communication between the accumulator electronics (protective circuit with intelligent charging) and the solar module.

Figure 3:
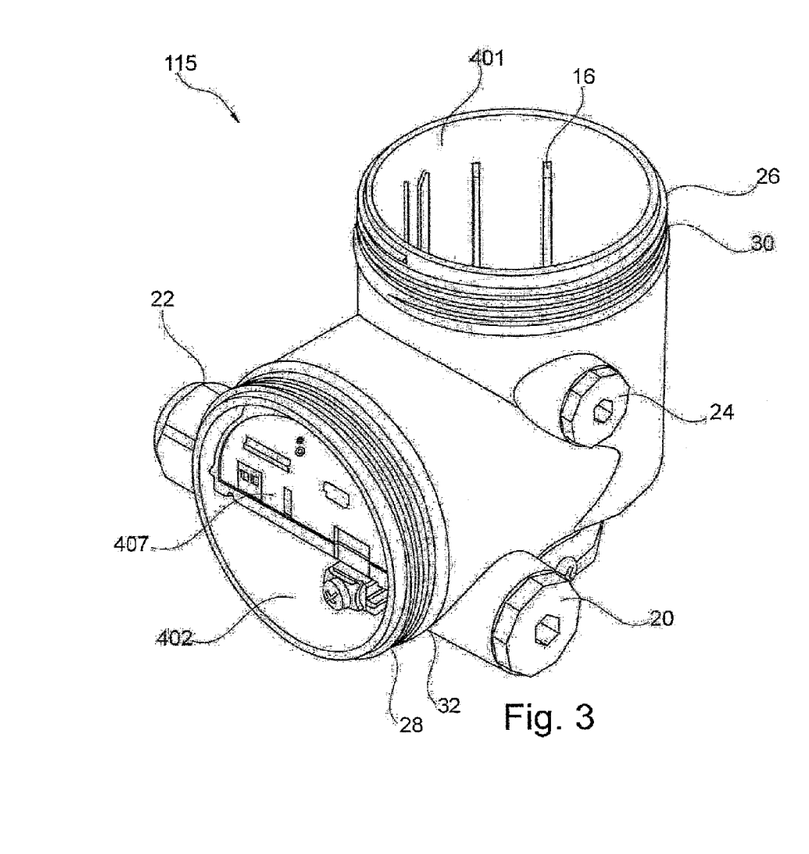
FIG. 3 shows a perspective view of a housing body according to an exemplary embodiment of the invention.

FIG. 3 shows a three-dimensional view of a housing body 115 with a first chamber 401 and a second chamber 402. The front regions of the two chambers 401 and 402 are cylindrical in shape, wherein the cylinder axes of the two chambers are perpendicular relative to one another. This results in an essentially L-shaped design of the housing body 115.

As further shown in FIG. 3, the external walls of the chambers 401 and 402, which at the same time form sections of the external wall of the housing body 115, may be reinforced by means of ribs 16. In the chamber 401 a measuring-value transmission module 407 is arranged. Furthermore, the housing body 115 comprises an antenna connection 20, a supply connection 22 and a control connection 24 or sensor supply connection 24.

The sensor supply connection 24 of the housing body 115 is suitable for connection to a 4-20 mA two-conductor loop with or without a Hart bus, to a Profibus PA or to a Foundation Fieldbus (FF).

The supply connection 22 can be connected to a voltage supply of between 4.8 V and 40 V DC.

The housing body 115 comprises a thread 26 for the second chamber 402, and a thread 28 for the first chamber 401, by means of which the two chambers 401, 402 can be closed with respective covers, wherein one cover can comprise the solar module. At the end of the thread 26, 28 there is an O-ring 30 or 32 that makes it possible to close the chamber 14, 16 so that it is waterproof. The threads 26, 28 are identical in design, so that covers of an identical design can be used to close the two chambers 401, 402.

FIGS. 4 to 9 show cross-sectional views of a sensor housing in various configurations. It should be noted that all the configurations shown in FIGS. 4 to 9 can also be provided by a multifunctional sensor housing, in which the corresponding interfaces are provided. It should be noted that the embodiments shown in FIGS. 4, 5, 8 and 9 in combination with the solar module require corresponding dimensioning, or a corresponding capacity, of the solar module. However, an effective energy saving circuit, for example as disclosed in this description, can also make it possible to use relatively small solar modules.

Figure 4:
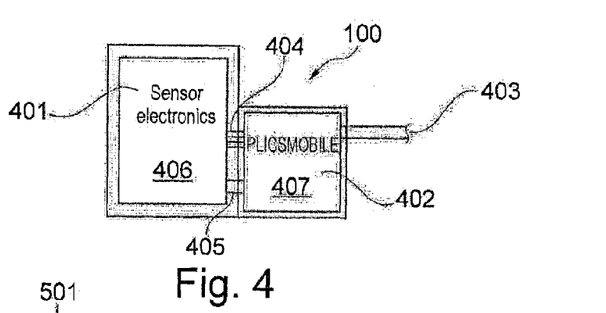
FIG. 4 shows a cross-sectional view of a sensor housing according to an exemplary embodiment of the invention.

FIG. 4 shows a sensor housing 100 (in other words a housing body 115 with corresponding installations and tops (e.g. covers 101, 102) and connections (e.g. interface 116)), which sensor housing 100 comprises a first chamber 401 and a second chamber 402. The first chamber 401 houses the sensor electronics 406, while the second chamber 402 houses a measured-value transmission module 407 for the transmission, either with or without cables, of measured values. For wireless transmission of measured values an antenna is provided (see for example FIG. 1). For wire-bound data transmission and energy supply a two-conductor loop 403 is provided, to which the measured-value transmission module 407 is connected.

The measured-value transmission module 407 is connected to the sensor electronics 406 in the first chamber by way of two conductors 405. The energy supply to the sensor electronics takes place by way of these two conductors 405. By way of the lines 404, data is exchanged between the sensor electronics 406 and the measured-value transmission module 407.

The communication line 404 is, for example, an I$^2$C connection.

Figure 5:
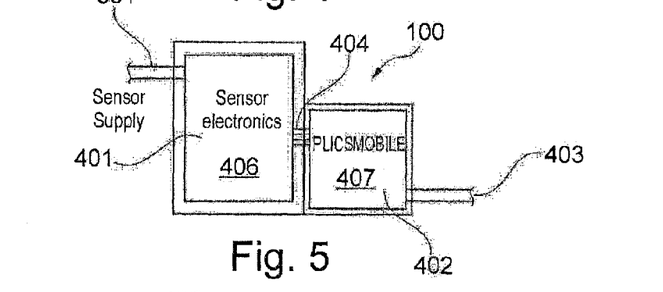
FIG. 5 shows a cross-sectional view of a sensor housing according to a further exemplary embodiment of the invention.

FIG. 5 shows a sensor housing 100 with sensor electronics 406 and a measured-value transmission module 407 in the two chambers. On the one hand the transmission module 402 is connected to an external power supply by way of the two-conductor loop 403. On the other hand the sensor electronics 406 are also connected to an external power supply by way of the two conductors 501.

In contrast to FIG. 4, supply to the sensor takes place by way of the two-conductor loop 501 (e.g. HART, Profibus PA or Foundation Fieldbus). It is thus possible for the measured value of the sensor to be used by a control device for control or regulating purposes, and parallel to this the measured value can be transmitted by way of the transmission module 407.

Figure 6:
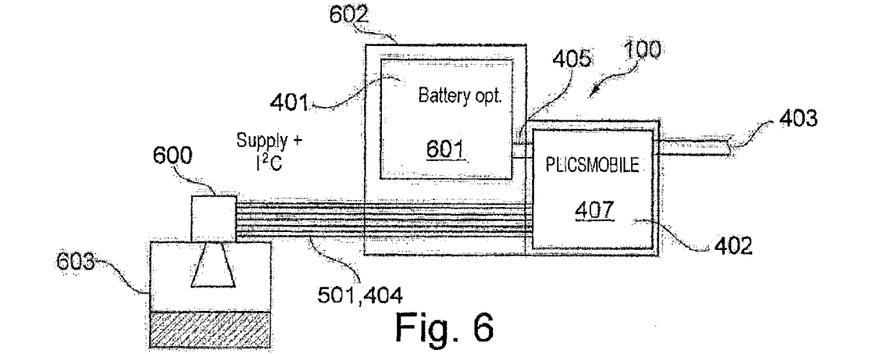
FIG. 6 shows a cross-sectional view of a sensor housing and of a fill level sensor according to a further exemplary embodiment of the invention.

In the exemplary embodiment of FIG. 6 the first chamber 401 comprises an energy storage module 601, for example in the form of an accumulator. The solar module (not shown in FIG. 6) is placed on top 602 of the first chamber 401.

In this embodiment the sensor 600 (pressure sensor, fill level sensor, etc.) is arranged so as to be separate from the sensor housing (rather than in the first chamber 401). The sensor 600 is installed in a tank 603 which contains a product. By way of a corresponding data line 404 (for example I$^2$C) and a supply line 501, the sensor 600 is connected to the measured-value transmission module 402. The location of installation of the sensor 600 and of the housing 100 with the measured-value transmission module 402 differs. This is necessary, for example, in those cases where the sensor 600 needs to be installed at a location that is unsuitable or inadequately suitable for GSM communication of the transmission module 402. This variant can also be used if the energy is to be obtained by the system from an accumulator with a solar module connected to it.

Figure 7:
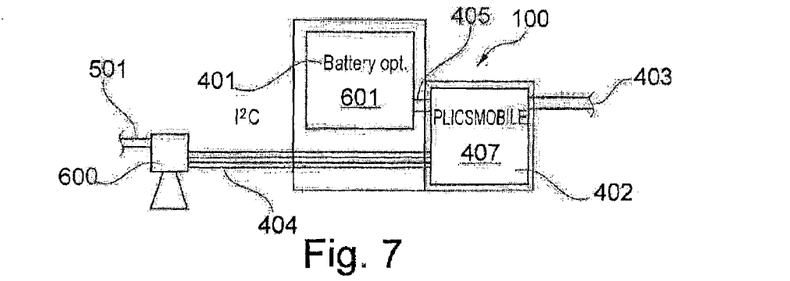
FIG. 7 shows a cross-sectional view of a sensor housing and of a field device according to a further exemplary embodiment of the invention.

FIG. 7 shows a further exemplary embodiment in which the sensor 600 is connected to a dedicated energy supply by way of the two conductors 501. In other words, supply to the sensor 600 is by way of a loop (e.g. HART, Profibus PA or Foundation Fieldbus).

Figure 8:
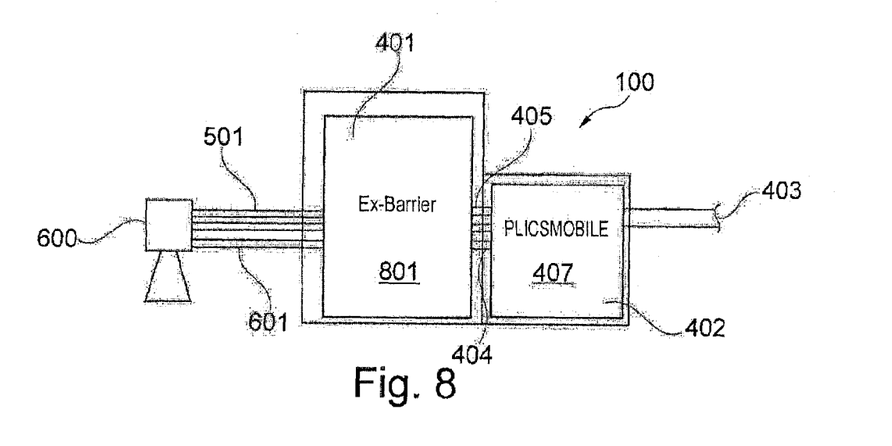
FIG. 8 shows a cross-sectional illustration of a sensor housing and of a field device according to a further exemplary embodiment of the invention.
Figure 9:
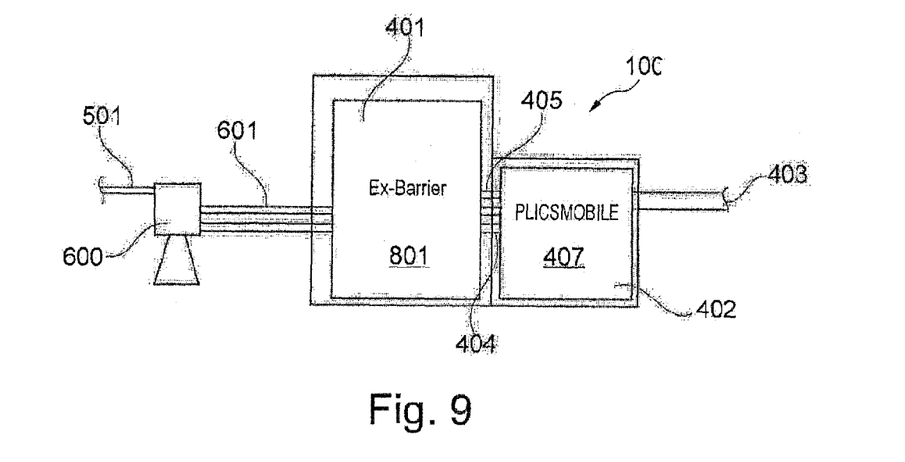
FIG. 9 shows a cross-sectional view of a sensor housing and of a field device according to a further exemplary embodiment of the invention.

In the exemplary embodiments of FIGS. 8 and 9 an explosion protection barrier (ex barrier) 801 is integrated. The ex barrier ensures the necessary limitation of voltage and current so that the sensor supply through the measured-value transmission module 402 takes place in a manner that is intrinsically safe (FIG. 8).

In this application the sensor housing 100 is always outside the ex region. This variant may be used for applications in which the sensor is located in a potentially explosive zone, and the measured values from this sensor are to be transmitted by way of the measured-value transmission module 402.

In the exemplary embodiment of FIG. 9 sensor supply is by way of the loop 501. This variant may thus be retrofitted to an existing installation.

The energy storage module 601 may house charge- and protection electronics. The solar module 200 may only house reverse polarity protection.

According to one aspect of the invention, the solar module may be oriented (in the direction of South in the northern hemisphere, or in the direction of the sun). This may take place by way of a ball-and-socket head at the base of the housing. Alignment may also be automatic. To this effect it is possible, for example, to provide a GPS receiver with a clock. Orientation by way of brightness sensors is also possible. Automatic orientation is associated with an advantage in that more energy is obtained, and in that at an inclination relative to horizontal (the ground) the system is less prone to dirt build-up.

If automatic tracking is provided, there is no need to provide a locking mechanism 106 (see FIG. 1). The adjustment mechanism is located in the holder (mounting connection 105). The device can be swivelled in all directions (up to the maximum tilt angle).

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A sensor housing for a field device for one of a fill level measuring, a pressure measuring, a limit measuring and a flow measuring, comprising:
a housing body;
a solar module placed on a top of the housing body, the solar module supplying the field device with an electrical energy; and
an energy storage module storing the electrical energy collected by the solar module, wherein the housing body includes a first chamber and a second chamber, the energy storage module being arranged in the first chamber,
wherein the solar module includes a first group of electrical sliding contacts, wherein the housing body includes a second group of electrical sliding contacts that corresponds to the first group, and wherein the electrical sliding contacts of the first group and the second group are matched to each other in such a way to allow the placement of the solar module on the top of the housing body and establish an electrical connection between the solar module and the energy storage module at various angles of rotation.

2. The sensor housing according to claim 1, further comprising: a measured-value transmission module transmitting measured values to an external unit, the measured-value transmission module being arranged in the second chamber.

3. The sensor housing according to claim 1, wherein the solar module is screwed onto the housing body.

4. The sensor housing according to claim 1, further comprising: charge—and protection electronics for the energy storage module, the charge—and protection electronics being situated in the energy storage module.

5. The sensor housing according to claim 1, further comprising: a mounting connection affixing the sensor housing to a mounting plate.

6. A sensor housing for a field device for one of a fill level measuring, a pressure measuring, a limit measuring and a flow measuring, comprising:
a housing body;
a solar module placed on a top of the housing body, the solar module supplying the field device with an electrical energy; and
a mounting connection affixin the sensor housing to a mounting plate,
wherein the mounting connection affixes the sensor housing to a ball-and-socket head which allows to tilt the sensor housing.

7. A sensor housing for a field device for one of a fill level measuring, a pressure measuring, a limit measuring and a flow measuring, comprising:
a housing body;
a solar module placed on a top of the housing body, the solar module supplying the field device with an electrical energy; and
an automatic tracking unit tilting the sensor housing so that a surface normal of the solar module points in a direction of the sun when the sensor housing is installed on a tank.

8. The sensor housing according to claim 7, further comprising:
a GPS receiver transmitting data relating to an actual position of the sun at a location of the sensor housing to the automatic tracking unit.

9. The sensor housing according to claim 7, further comprising:
a brightness sensor determining a direction from which sunlight shines into the solar module and transferring data relating to the direction to the automatic tracking unit.

10. A field device for one of a fill level measuring, a pressure measuring, a limit measuring and a flow measuring, comprising:
a sensor housing including a housing body and a solar module placed on a top of the housing body, the solar module supplying the field device with an electrical energy,
wherein the solar module includes a first group of electrical sliding contacts, wherein the housing body includes a second group of electrical sliding contacts that corresponds to the first group, and wherein the electrical sliding contacts of the first group and the second group are matched to each other in such a way to allow the placement of the solar module on the top of the housing body and establish an electrical connection between the solar module and the energy storage module at various angles of rotation.

11. A modular system for producing various field devices for one of a fill level measuring, a limit measuring, a pressure measuring and a flow measuring, comprising:
a sensor housing including a solar module placed on a top of the sensor housing, the solar module supplying the field device with an electrical energy,
wherein the solar module includes a first group of electrical sliding contacts, wherein the housing body includes a second group of electrical sliding contacts that corresponds to the first group, and wherein the electrical sliding contacts of the first group and the second group are matched to each other in such a way to allow the placement of the solar module on the top of the housing body and establish an electrical connection between the solar module and the energy storage module at various angles of rotation.

12. The modular system according to claim 11, further comprising sensor electronics; and a control module; and an energy storage module storing the electrical energy collected by the solar module, wherein the energy storage module is exchangeable by the sensor electronics and wherein the solar module is exchangeable by the control module.

13. A field device for one of a fill level measuring, a pressure measuring, a limit measuring and a flow measuring, comprising:
- a sensor housing including a housing body and a solar module placed on a top of the housing body, the solar module supplying the field device with an electrical energy;
and
- a mounting connection affixing the sensor housing to a mounting plate,
- wherein the mounting connection affixes the sensor housing to a ball-and-socket head which allows to tilt the sensor housing.

14. A field device for one of a fill level measuring, a pressure measuring, a limit measuring and a flow measuring, comprising:
- a sensor housing including a housing body and a solar module placed on a top of the housing body, the solar module supplying the field device with an electrical energy; and
- an automatic tracking unit tilting the sensor housing so that a surface normal of the solar module points in a direction of the sun when the sensor housing is installed on a tank.

15. A modular system for producing various field devices for one of a fill level measuring, a limit measuring, a pressure measuring and a flow measuring, comprising:
- a sensor housing including a solar module placed on a top of the sensor housing, the solar module supplying the field device with an electrical energy; and
- a mounting connection affixing the sensor housing to a mounting plate,
- wherein the mounting connection affixes the sensor housing to a ball-and-socket head which allows to tilt the sensor housing.

16. A modular system for producing various field devices for one of a fill level measuring, a limit measuring, a pressure measuring and a flow measuring, comprising:
- a sensor housing including a solar module placed on a top of the sensor housing, the solar module supplying the field device with an electrical energy; and
- an automatic tracking unit tilting the sensor housing so that a surface normal of the solar module points in a direction of the sun when the sensor housing is installed on a tank.

* * * * *